United States Patent [19]

Tokunaga

[11] 3,780,519
[45] Dec. 25, 1973

[54] TIMEPIECE DIAL WITH ELECTRICALLY CONDUCTING FOOT
[75] Inventor: Ikuo Tokunaga, Suwa, Japan
[73] Assignee: Kabushiki Kaisha Suwa Seikosha, Tokyo, Japan
[22] Filed: Dec. 23, 1971
[21] Appl. No.: 211,501

[30] Foreign Application Priority Data
Dec. 29, 1970 Japan.............................. 45/141705

[52] U.S. Cl. ................ 58/23 C, 58/50 R, 58/127 R
[51] Int. Cl. ........................ G04c 3/00, G04b 19/06
[58] Field of Search ................ 58/23 R, 23 C, 50 R, 58/127 R; 250/200, 239

[56] References Cited
UNITED STATES PATENTS
3,427,797  2/1969  Kimura et al...................... 58/23 BA Primary Examiner—Richard B. Wilkinson
Assistant Examiner—Edith Simmons Jackmon
Attorney—Alex Friedman et al.

[57] ABSTRACT

In a timepiece driven by a cell which is charged by a solar battery, connection is made between the solar battery which is mounted in the dial and the cell which is interior to the timepiece by means of at least one electrically conducting foot which is part of the dial. The electrically conducting foot may be so constructed that it serves to connect one terminal of the solar battery to the cell or both terminals of the solar battery to the cell. A similar foot may be used for connecting the cell to other electrical components of said timepiece.

6 Claims, 5 Drawing Figures

TIMEPIECE DIAL WITH ELECTRICALLY CONDUCTING FOOT

BACKGROUND OF THE INVENTION

In timepieces comprising a solar battery attached to the dial, connections must be provided between the solar battery and the cell which it charges. Conventionally, connection is made by means of lead wires between the solar battery and the cell. However, such lead wires must be long in order to make it possible to mount and remove the dial from the timepiece. The lead wires must be coiled or otherwise twisted in mounting the dial, so that they require considerable space are apt to be broken or disconnected as the result of torsion in the wire, and open the watch to the entrance of dust. Moreover, mounting and removing the dial of the watch are operations requiring considerable time and considerable skill.

SUMMARY OF THE INVENTION

According to the present invention, the dial of a timepiece is provided with an electrically conducting foot which makes contact with at least one terminal of a solar battery mounted in the dial. The electrically conducting foot then serves to carry current to the cell which is charged by the solar battery. Depending on the construction, the electrically conducting foot may consist of either one or two conductors, in the latter case, the conductors being insulated from each other. Where the electrically conducting foot consists of two conductors, it serves to make connection with both terminals of the solar battery.

Accordingly, an object of the present invention is to provide an improved means of making electrical connections between a solar battery mounted in the dial of a timepiece and a cell which drives the timepiece.

Another object of the present invention is to provide an improved means of making electrical contact between a solar battery and a cell wherein the use of long and twisted lead wires is avoided.

A further object of the invention is to provide an improved means of making electrical connection between a solar battery mounted in a dial and a cell wherein the labor of mounting and removing the dial is greatly decreased.

Still other objects and advantages of the invention will in part be obvious and will in part be apparent from the specification.

The invention accordingly comprises an article of manufacture possessing the features, properties, and the relation of elements which will be exemplified in the article here inafter described, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
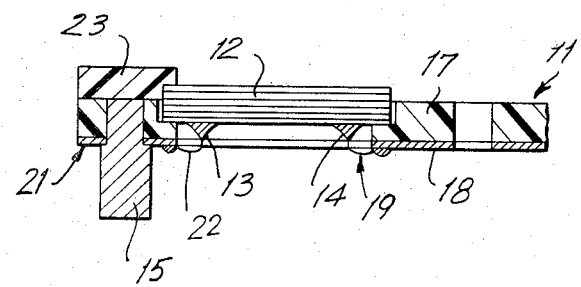
FIG. 1 is a partial sectional view of a timepiece in accordance with the present invention having an electrically conducting foot.

A timepiece dial having an electrically conducting foot in accordance with the present invention is generally indicated by the reference numeral 11, the dial including a solar cell 12 having terminals 13 and 14 and electrically conducting foot 15. The dial itself 17 has deposited thereon a conductive layer 18 which may be held to the dial 17 by means of an adhesive and which is connected to solar cell terminal 14 by lead wire 19. A thin layer of conductive material 21 is electrically isolated from layer 18, and makes contact with conductive foot 15. Solar cell terminal 13 is connected to thin layer 21 by lead wire 22. Solar cell 12 is held in place in dial 17 by member 23.

Figure 2:
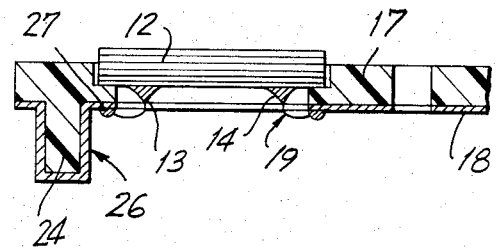
FIG. 2 is a partial sectional view of another embodiment of the invention.

A somewhat simpler construction is shwon in FIG. 2 where solar cell 12 is held to dial 17 by adhesive (not shown). In this embodiment, the central portion of foot 24 is an insulator; the exterior of foot 24 is covered by conductive layer 26 which also covers shoulder 27 so that electrical connection can be made by means of lead wire 22 to solar cell terminal 13.

Figure 3:
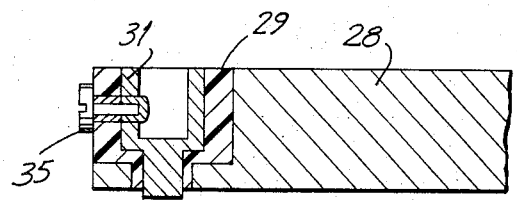
FIG. 3 is a partial sectional view of a plate with an orifice intended for reception of an electrically conducting foot.

The timepiece (not shown) having the dial 17 also has therein a plate 28 (FIG. 3) which holds insulating ring 29. Insulating ring 29 has therein socket 31 of electrically conductive material for receiving either of the feet of the dials of FIGS. 1 and 2. Socket 31 may be held in ring 29 by means of adhesive. It is also held therein by set screw 35 which further serves to anchor the electrically conducting foot of whichever dial is used. A wire (not shown) may be fastened beneath the head of set screw 35 to make electrical connection to a cell which is charged by the solar cell 12.

Figure 4:
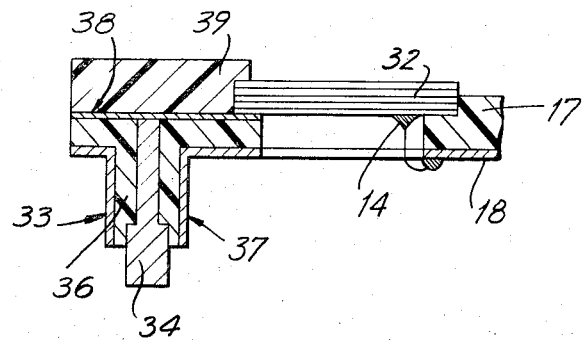
FIG. 4 is a partial sectional view of a further embodiment of the invention wherein the foot has two electrically conducting members.
Figure 5:
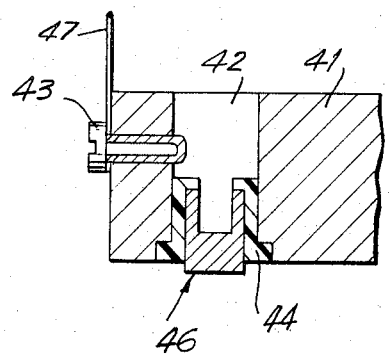
FIG. 5 is a partial sectional view of a plate designed to receive the foot of FIG. 4.

Feet 15 of FIG. 1 and 24 of FIG. 2 each carry only one lead from solar cell 12. An embodiment in which an electrically conducting foot carries both leads from a solar cell is shown in FIG. 4 where dial 17 connects with one terminal of solar cell 32 in the usual way. In this embodiment foot 33 is essentially annular in construction having an axial conductor 34, an annular insulator 36 about central conductor 34 and an exterior conductor 37 which is continuous with conductor 18 on the remainder of the dial. Connection between axial conductor 34 and a terminal of cell 32 is comprised of a layer of conductive material deposited on insulator 36 and held in place by cover 39 which also holds solar cell 32 in place. Thin layer 38 may be vapor deposited on foot 36 or may be in the form of metal leaf held thereto by adhesive. Similarly, cover 39 may also be held in contact with metal layer 38 by means of adhesive.

Plate 41 of the timepiece (not shown) having the dial of FIG. 4 is made of a conductive material and has an opening 42 therein for receiving foot 33. Electrical contact is made directly between metal 41 and exterior conductor 37 of foot 33 when the foot is inserted in the orifice 42. This contact is supplemented by pressure from screw 43 which also holds a lead wire 47 which makes contact with one terminal of the cell which drives the timepiece. The bottom portion of opening 42 has an insulating liner 44 cemented to plate 41. Within this liner 44 is an electrically conducting socket 46 which receives axial conductor 34, making electrical contact therewith. Socket 46 makes electrical contact with the other terminal of the timepiece cell. As can be seen, a single foot on dial 17 makes it possible to connect both terminals of solar cell 32 through a metal plate 41 and its socket 46 to a timepiece cell for the purpose of charging same.

As can be seen, a dial constructed in accordance with the present invention makes it simple to assemble an electrically driven timepiece having a solar battery as well as simple to dismount same. Long lead-in wires are eliminated, saving space, weight and cost as well as preventing ingress of dust. The danger of breaking lead wires by twisting during mounting and removal is eliminated and the problems of after-sales service are greatly simplified.

As is evident, the concept of a conducting foot can be extended in a variety of ways such as the use of such a foot to carry power from the timepiece cell to electrical elements of the dial. Such elements could include not only the device responsible for rotating the hands but also electroluminescent indicia.

It will thus be seen that the objects set forth above, among those made apparent from the preceding description, are effeciently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An improved electrically driven timepiece wherein a solar battery is used for charging a cell within said timepiece, comprising a dial of an insulating material, a foot attached to said dial, at least a part of said foot being of electrically conducting material, and a conductive plate proximate said dial, said plate having therein a conductive socket insulated from said plate, said socket being shaped to receive said foot sufficiently tightly to establish electrical contact therebetween and with sufficient clearance so that said dial with its foot can readily be separated from said plate, said foot and said socket serving as an electrical conductor between at least one of the electrodes of said solar battery and said cell.

2. An improved electrically driven timepiece wherein a solar battery is used for charging a cell within said timepiece, comprising a dial of an insulating material, an electrically conductive layer on the inner surface of said dial connected to one of the electrodes of said battery and a foot attached to said dial, at least a part of said foot being of electrically conductive material insulated from said electrically conductive layer, said foot serving as an electrical conductor between the other of the electrodes of said solar battery and one of the electrodes of said cell, and said electrically conductive layer being removably connectable electrically with the other terminal of said cell.

3. The timepiece as defined in claim 2, further comprising a plate, an orifice in said plate, an insulating liner in said orifice and a conductive annulus in said liner, said conductive annulus being dimensioned to receive and make electrical contact with said electrically conducting foot.

4. The timepiece as defined in claim 2, wherein said foot is annular in construction comprising an electrically conductive axial member, an electrically conductive external member, and an annular insulating member separating said conductive members, each of which is electrically connected to a different terminal of said solar battery.

5. The timepiece as defined in claim 4, wherein said timepiece further comprises a conductive plate having an opening therein into which said annular foot is receivable, an insulating liner in said opening and a socket of conducting material within said insulating liner, electrical contact being established between the external conductor of said foot and the wall of the opening in said conductive plate and between the axial conducting member of said foot and said socket when said foot is seated in said opening in said plate.

6. The timepiece as defined in claim 4, wherein said plate has a set-screw extending into said opening, and a lead-wire under the head of said set-screw, said set-screw further serving to hold said foot securely in said opening and said lead wire serving to make electrical connection between said plate and said cell.

* * * * *